US012204738B2

(12) United States Patent
Hirata et al.

(10) Patent No.: US 12,204,738 B2
(45) Date of Patent: **\*Jan. 21, 2025**

(54) INFORMATION PROCESSING DEVICE, INFORMATION PROCESSING METHOD, STORAGE MEDIUM, AND GUIDE SYSTEM

(71) Applicant: Fast Retailing Co., Ltd., Yamaguchi (JP)

(72) Inventors: Jun Hirata, Yamaguchi (JP); Yuya Furukawa, Yamaguchi (JP)

(73) Assignee: Fast Retailing Co., Ltd., Yamaguchi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/364,916

(22) Filed: Aug. 3, 2023

(65) Prior Publication Data

US 2024/0019986 A1  Jan. 18, 2024

Related U.S. Application Data

(63) Continuation of application No. 17/242,109, filed on Apr. 27, 2021, now Pat. No. 11,755,173.

(30) Foreign Application Priority Data

Apr. 28, 2020 (JP) .................................. 2020-78957

(51) Int. Cl.
*G06F 3/04817* (2022.01)
*G06Q 30/02* (2023.01)
(Continued)

(52) U.S. Cl.
CPC ..... *G06F 3/04817* (2013.01); *G06Q 30/0261* (2013.01); *G06Q 30/0267* (2013.01);
(Continued)

(58) Field of Classification Search
CPC .......... G06Q 30/0639; G06Q 30/0643; G06Q 30/0281; G06F 3/04817
See application file for complete search history.

(56) References Cited

U.S. PATENT DOCUMENTS 9,607,323 B2   3/2017   Masuko et al.
9,702,707 B2   7/2017   Goldman et al.
(Continued)

FOREIGN PATENT DOCUMENTS

CN    110770719 A    2/2020
JP    2007-316897 A  12/2007
(Continued)

OTHER PUBLICATIONS

Office Action for App. No. CN 202110455404 mailed Jan. 10, 2024.
(Continued)

*Primary Examiner* — Mong-Shune Chung
(74) *Attorney, Agent, or Firm* — Carter, DeLuca & Farrell LLP

(57) ABSTRACT

An information processing device includes a reception unit configured to receive designation of a plurality of products by a user, and a display control unit configured to display thumbnail images corresponding to at least a part of the plurality of products and a floor map on which icons indicating pieces of positional information of at least two or more products of the plurality of products are displayed in an identifiable manner. The display control unit displays the icons and the thumbnail images in such a way that the correspondence between them can be identified.

7 Claims, 9 Drawing Sheets

(51) Int. Cl.
*G06Q 30/0251* (2023.01)
*G06Q 30/0601* (2023.01)

(52) U.S. Cl.
CPC ..... *G06Q 30/0281* (2013.01); *G06Q 30/0639* (2013.01); *G06Q 30/0643* (2013.01)

(56) References Cited

U.S. PATENT DOCUMENTS

| | | | |
|---|---|---|---|
| 11,755,173 | B2 | 9/2023 | Hirata et al. |
| 2007/0107371 | A1* | 5/2007 | Plocher ............... G06T 19/20 52/745.05 |
| 2012/0226556 | A1 | 9/2012 | Itagaki et al. |
| 2013/0147604 | A1* | 6/2013 | Jones, Jr. ............. G08B 25/08 340/6.1 |
| 2014/0108192 | A1 | 4/2014 | Goulart et al. |
| 2014/0207615 | A1 | 7/2014 | Li et al. |
| 2014/0214595 | A1 | 7/2014 | Argue et al. |
| 2014/0365272 | A1* | 12/2014 | Hurewitz ........... G06Q 30/0201 705/7.29 |
| 2015/0020008 | A1* | 1/2015 | Pensack-Rinehart ................. G01C 21/383 715/765 |
| 2015/0206227 | A1* | 7/2015 | Borom ............... G06Q 30/0601 705/26.7 |
| 2016/0284014 | A1* | 9/2016 | Adel ................... G06Q 10/087 |
| 2016/0371606 | A1* | 12/2016 | Schmidt ............... G06Q 10/02 |
| 2017/0186077 | A1 | 6/2017 | Srinivasan et al. |
| 2018/0012267 | A1* | 1/2018 | Bordewieck ........... G06Q 20/20 |
| 2018/0040037 | A1* | 2/2018 | Blair, II ............. G06Q 30/0281 |
| 2018/0276543 | A1 | 9/2018 | Parrotta et al. |
| 2018/0352374 | A1* | 12/2018 | Ball ..................... G06F 16/9537 |
| 2019/0005569 | A1 | 1/2019 | Kotha et al. |
| 2020/0005378 | A1* | 1/2020 | Anderson ........... G01C 21/206 |
| 2021/0295047 | A1 | 9/2021 | Furlan et al. |
| 2021/0334889 | A1* | 10/2021 | Isgar ..................... H04N 7/185 |

FOREIGN PATENT DOCUMENTS

| | | |
|---|---|---|
| JP | 2012-180065 A | 9/2012 |
| JP | 5497936 B1 | 5/2014 |
| JP | 2014-203251 A | 10/2014 |
| JP | 2015-049817 A | 3/2015 |
| JP | 2017-211932 A | 11/2017 |
| JP | 2018-097390 A | 6/2018 |
| JP | 2018-151972 A | 9/2018 |
| JP | 2019-040242 A | 3/2019 |
| KR | 10-2018-0085818 A | 7/2018 |

OTHER PUBLICATIONS

[No Author] Indoor Positioning in Shopping Malls. Jan. 16, 2019. https://zhuanlan.zhihu.com/p/55024092 [last accessed Jan. 5, 2024].
Office Action for App. No. KR 10-2023-0089826 mailed Mar. 6, 2024.

* cited by examiner

INFORMATION PROCESSING DEVICE, INFORMATION PROCESSING METHOD, STORAGE MEDIUM, AND GUIDE SYSTEM

CROSS REFERENCE TO RELATED APPLICATION

The present application is a Continuation application of application Ser. No. 17/242,109, filed Apr. 27, 2021, which claims priority to Japanese Application No. 2020-78957, filed Apr. 28, 2020. The aforementioned application is hereby incorporated by reference herein.

BACKGROUND

In clothing stores and the like, various clothing items are displayed as products in stores. Compared to products in other fields, clothing has a shorter cycle, and products in demand vary depending on the weather, and thus it is necessary to frequently change the layout in stores. For this reason, it is difficult for a consumer to find a desired product in a store, and there are cases where even a clerk has difficulty in grasping the display positions of products.

JP 2007-316897 A discloses technology for guiding a user to the position of a specific product by acquiring position information of each product in advance by RFID scanning and also position information of the user who is operating a smartphone.

SUMMARY

According to some embodiments of the present invention, an information processing device includes
 a reception unit configured to receive designation of a plurality of products by a user, and
 a display control unit configured to display thumbnail images corresponding to at least a part of the plurality of products and a floor map on which icons indicating pieces of positional information of at least two or more products of the plurality of products are displayed in an identifiable manner,
 in which the display control unit displays the icons and the thumbnail images in such a way that the correspondence between them can be identified.
Further features of the present disclosure will become apparent from the following description of exemplary embodiments with reference to the attached drawings.

DESCRIPTION OF THE EMBODIMENTS

Figure 1:
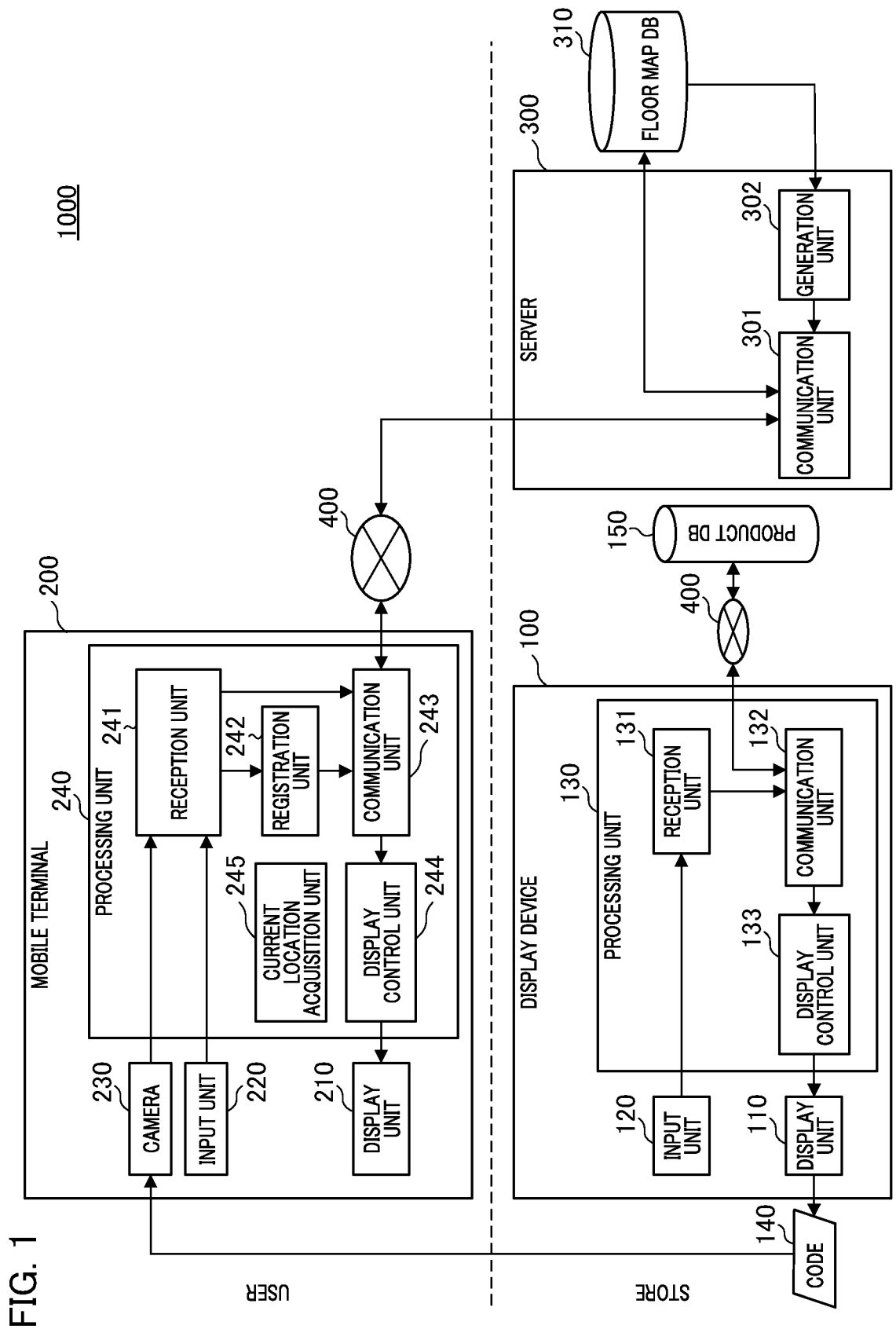
FIG. 1 is a configuration diagram showing a configuration of a guide system including a display device.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

First Embodiment

FIG. 1 is a configuration diagram showing a configuration of a guide system 1000 including a display device 100. The guide system 1000 includes a display device 100, a mobile terminal 200, and a server 300. The mobile terminal 200 and the server 300 are connected so as to be able to communicate with each other via a network 400. The network 400 includes, for example, the Internet, a wide area network (WAN), a local area network (LAN), a wireless base station such as WiFi, a provider device, a dedicated line, and the like. The guide system 1000 is a system that guides a product position to a user by displaying pieces of positional information corresponding to a plurality of products designated by the user on the display device 100 or the mobile terminal 200.

The display device 100 is, for example, a display device (signage device), a smartphone, a tablet terminal, a notebook personal computer (PC), a desktop PC, a mobile phone, or the like installed inside or outside a store of a clothing selling shop. In the present specification, it is assumed that the mobile terminal means an information processing device that can be carried by a user such as a smartphone, a tablet terminal, a notebook PC, or a mobile phone. The display device 100 includes a display unit 110, an input unit 120, and a processing unit 130.

The display unit 110 is, for example, a liquid crystal display panel, a plasma display panel, an organic EL display panel, or the like, and is controlled by the processing unit 130. The display unit 110 displays a predetermined screen under the control of the processing unit 130.

The input unit 120 is, for example, a touch panel, a keyboard, a mouse, or the like that receives operation inputs by the user, and receives instructions and inputs by the user by the touch panel and keys. When the display device 100 is the signage device, the tablet terminal, or the like, the input unit 120 may also function as the display unit 110, and the display unit 110 and the input unit 120 may have an integrated structure. For example, the user designates the product by using the input unit 120.

The processing unit 130 includes a reception unit 131, a communication unit 132, and a display control unit 133. The reception unit 131 receives an input such as the designation of the product by the user. For example, the communication unit 132 receives positional information associated with identification information of the product for which the designation by the user is received by the reception unit 131 from a database (product DB 150) for managing product inventory in a store in which the display device 100 is installed. The display control unit 133 performs display on the display unit 110 such that icons are identifiable at positions on a floor map corresponding to the pieces of positional information received by the communication unit 132 and a correspondence between the icons and thumbnail images is identifiable. At this time, inventory information may be received together with the positional information and the inventory of the product may be displayed. The details of the screen displayed on the display unit 110 will be described later. The display control unit 133 displays a code 140 for displaying the thumbnail image of the designated product and the screen including the floor map on the mobile terminal 200 on the display unit 110 of the display device 100 by reading the code on the mobile terminal 200. Here, the code 140 is, for example, a two-dimensional code such as a QR code (trademark) or a barcode.

The positional information of the product can be obtained, for example, by acquiring the identification information of the product from a tag attached to the product displayed in the store and positional information of the tag by a reading device (not shown). Here, the identification information of the product includes at least color information and size information of the product. Of course, the size and color may be replaced with the corresponding information (numerical values such as numbers). For example, "S, M, L" may be replaced with "1, 2, 3", or "white, black, yellow" may be replaced with "00, 09, 45" for colors. The tag is capable of recording the identification information of the product, such as an RFID tag. The positional information of the tag is converted into positional information (display positional information) to be reflected on the floor map of the store and stored in the product DB 150.

The product DB 150 is connected so as to be able to communicate with the display device 100 via the network 400. The product DB 150 stores the display positional information in association with the identification information. Here, the product DB 150 may further store the display positional information in association with floor identification information for identifying which store the floor belongs and which floor of the store this floor corresponds. The product DB 150 also stores the thumbnail image corresponding to the identification information of the product.

Next, the mobile terminal 200 will be described. The mobile terminal 200 is a mobile terminal carried by a user (customer) of a store such as a clothing store. The mobile terminal 200 includes a display unit 210, an input unit 220, a camera 230 (imaging unit), and a processing unit 240.

The display unit 210 is, for example, a liquid crystal display panel, a plasma display panel, an organic EL display panel, or the like, and is controlled by the processing unit 240. The display unit 210 displays a predetermined screen under the control of the processing unit 240.

The input unit 220 is, for example, a touch panel, a keyboard, a mouse, or the like that receives operation inputs by the user, and receives instructions and inputs by the user by the touch panel and keys. The display unit 210 and the input unit 220 may have an integrated structure such as a touch panel. The user designates or registers the product or the store, for example, by using the input unit 220.

The camera 230 is a device for capturing an object, and includes, for example, a lens and an image sensor. The camera 230 captures and reads the code 140 included in the screen displayed on the display device 100, and thus, code information included in the code 140 is extracted by the mobile terminal 200. Here, the code information is, for example, a Uniform Resource Locator (URL). The code information may include the identification information of the designated product. The mobile terminal is connected to the read URL via the communication unit 243, and thus, a screen including the thumbnail image of the designated product and the floor map is displayed on the display unit 210 of the mobile terminal 200. The code 140 is read by the camera 230 multiple times, and thus, the floor map on which icons indicating the pieces of positional information of two or more products are displayed in an identifiable manner is displayed on the display unit 210 of the mobile terminal 200.

The processing unit 240 includes a reception unit 241, a communication unit 243, a display control unit 244, and a current location acquisition unit 245. The reception unit 241 receives the code information read by the camera 230 and transmits the received code information to the communication unit 243. For example, the reception unit 241 receives the designation of the product or the store by the user. A registration unit 242 registers the designated product in a purchase consideration list (also referred to as a favorite list). It is preferable that the registration unit 242 can register, as information on the store, a favorite store that the user often visits by the user designating the store. For example, the communication unit 243 receives the screen including the thumbnail image of the designated product and the floor map from the server 300 based on the code information. The display control unit 244 displays the screen received from the server 300 on the display unit 110. The current location acquisition unit 245 acquires a current location of the mobile terminal 200.

The server 300 includes a communication unit 301 and a generation unit 302. The communication unit 301 receives the code information from the mobile terminal 200 and extracts information corresponding to the code information from a floor map DB 310. That is, the communication unit 301 receives the positional information associated with the identification information of the product included in the code information from the floor map DB 310. Similar to the product DB 150, the floor map DB 310 stores the display positional information of the product in association with the identification information, and also stores the thumbnail image corresponding to the identification information of the product. The floor map DB 310 also stores the floor map of the store. The floor map DB 310 outputs the positional information and the floor map corresponding to the identification information of the product included in the received code information to the generation unit 302 via the communication unit 301. The floor map DB 310 also outputs the thumbnail image of the product included in the code information to the generation unit 302. The generation unit 302 displays an icon indicating a position of the product at a location on the floor map corresponding to the received positional information in an identifiable manner, and generates the screen including the floor map and the thumbnail image. The generation unit 302 then transmits the floor map on which the positional information of the designated product is displayed and the screen including the thumbnail image corresponding to the designated product to the mobile terminal 200 via the communication unit 301. The screen is transmitted to the mobile terminal 200, and thus, the screen including the thumbnail image of the designated product and the floor map is displayed on the display unit 210 of the mobile terminal 200.

Figure 2:
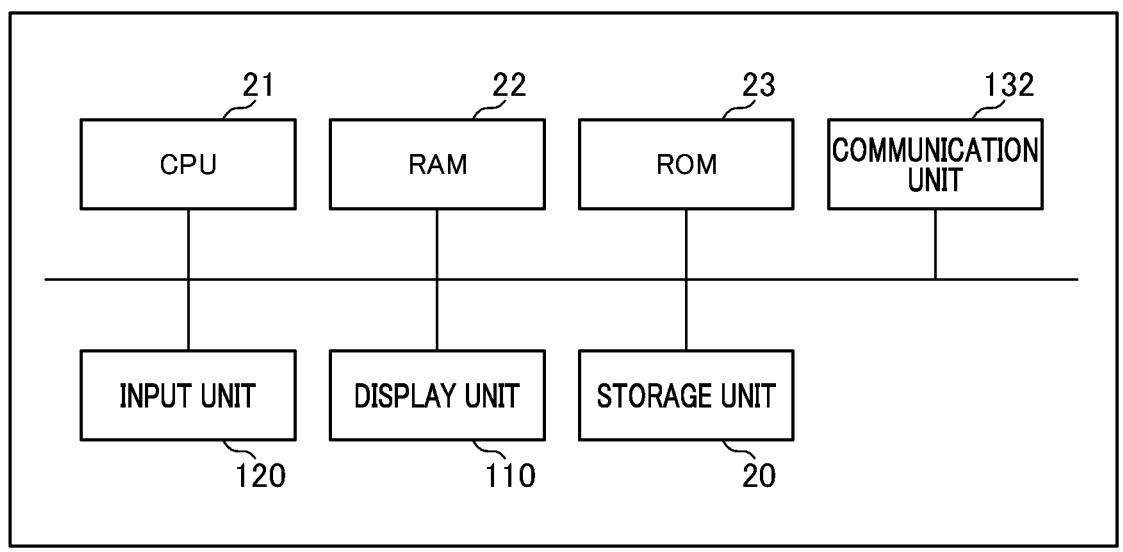
FIG. 2 is a block diagram showing a hardware configuration of the display device.

FIG. 2 is a block diagram showing a hardware configuration of the display device 100. The display device 100 includes a storage unit 20, a CPU 21, a RAM 22, a ROM 23, a communication unit 132, a display unit 110, and an input unit 120.

The storage unit 20 stores a program that realizes a flow to be described later by being executed by the CPU 21 and data and the like used by this program.

The CPU 21 operates based on a program stored in the ROM 23 or the storage unit 20, and controls each unit of the display device 100. The ROM 23 stores a boot program executed by the CPU 21 when the display device 100 is started, a program depending on the hardware of the display device 100, and the like. The program of the ROM 23 is loaded into the RAM 22, and the CPU 21 executes the loaded program. Thus, the CPU 21 realizes a flow to be described later The CPU 21 may acquire these programs from another device via the network 400 and execute the programs, or may directly execute the programs stored in the ROM 23.

The communication unit 132 receives data from another device via the network 400, transmits the received data to the CPU 21, and transmits data and instructions generated by the CPU 21 to another device via the network 400. The product DB 150, the mobile terminal 200, the server 300, and the floor map DB 310 each have the same configuration as the configuration in FIG. 2, and thus, detailed description thereof will be omitted.

Figure 3:
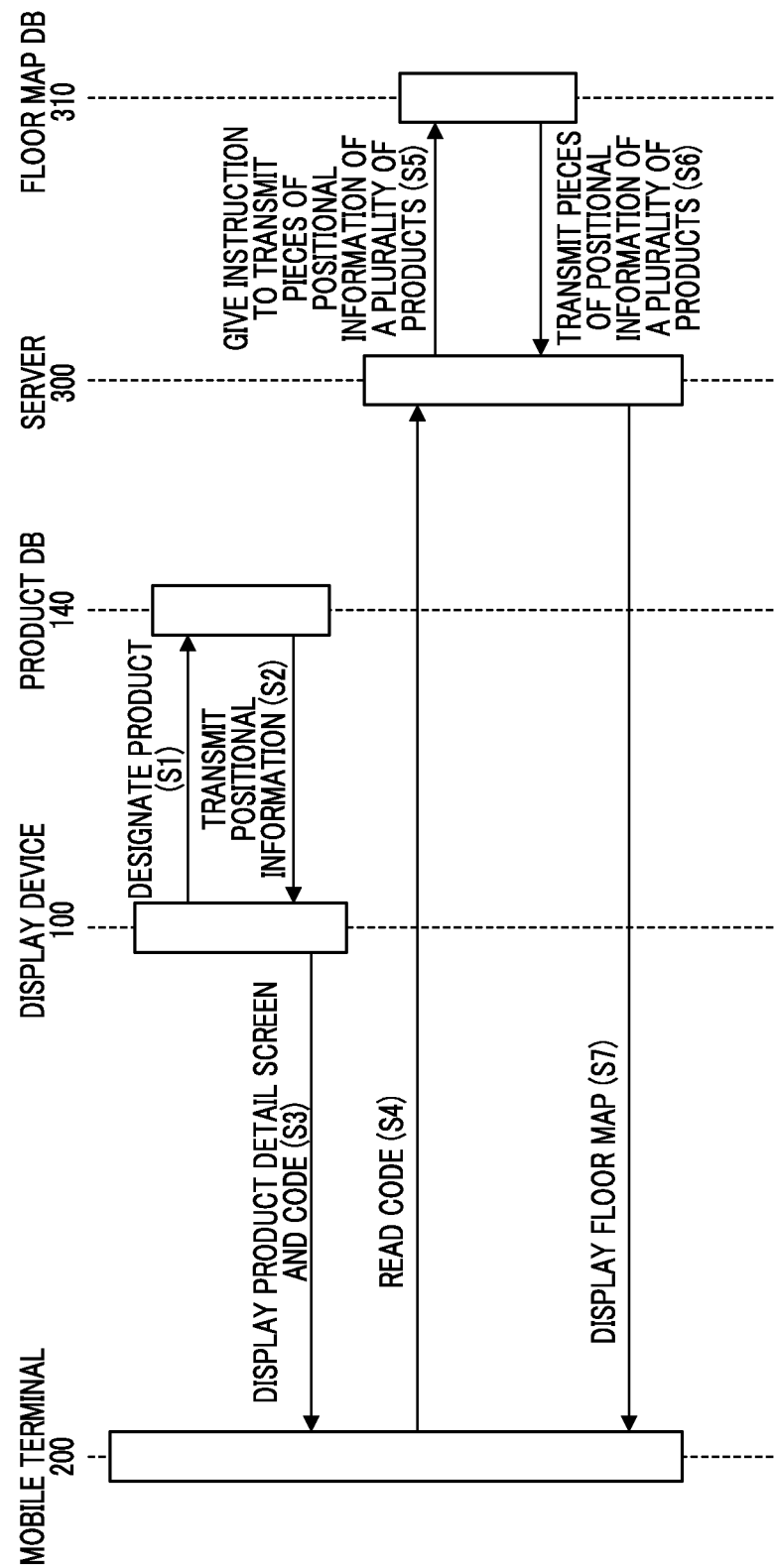
FIG. 3 is a sequence diagram of floor map display processing according to a first embodiment.

FIG. 3 is a sequence diagram of floor map display processing according to the first embodiment. First, the user designates the product by using the display device 100 installed in the store (S1). The product can be designated, for example, by selecting a category displayed on the display device 100, or by searching for from a product name or an identification number given to each product. For example, when the display device 100 is a smartphone or the like and is provided with a camera, the product may be designated by capturing the tag of the product in the store with the camera. The product can be selected from a coordination image displayed on the display device 100. The product DB 150 outputs the positional information corresponding to the identification information of the product designated by the user to the display device 100 (S2). The display device 100 displays the floor map on which the position of the designated product is represented, the thumbnail image of the designated product, and the code 140 to be read by the mobile terminal 200 on the display unit 110 based on the received positional information (S3). Thereafter, the code displayed on the display device 100 is read by using the mobile terminal 200 (S4). S1 to S4 are performed multiple times. Accordingly, a plurality of products is designated.

The server 300 transmits, to the floor map DB 310, an instruction to transmit the positional information, the floor map, and the thumbnail image corresponding to the identification information of the product corresponding to the code information, that is, each of the plurality of designated products to the server 300 (S5). The floor map DB 310 outputs the positional information, the floor map, and the thumbnail image corresponding to the identification information of each of the plurality of products corresponding to the code information to the server 300 (S6). The server 300 displays the icon indicating the position of each of the plurality of products at the location on the floor map corresponding to the positional information received from the floor map DB 310 in an identifiable manner, generates the screen including the floor map on which the product position is represented and the thumbnail image, and transmits the screen to the mobile terminal 200. The screen is displayed on the display unit 210 of the mobile terminal 200 (S7).

Figure 4:
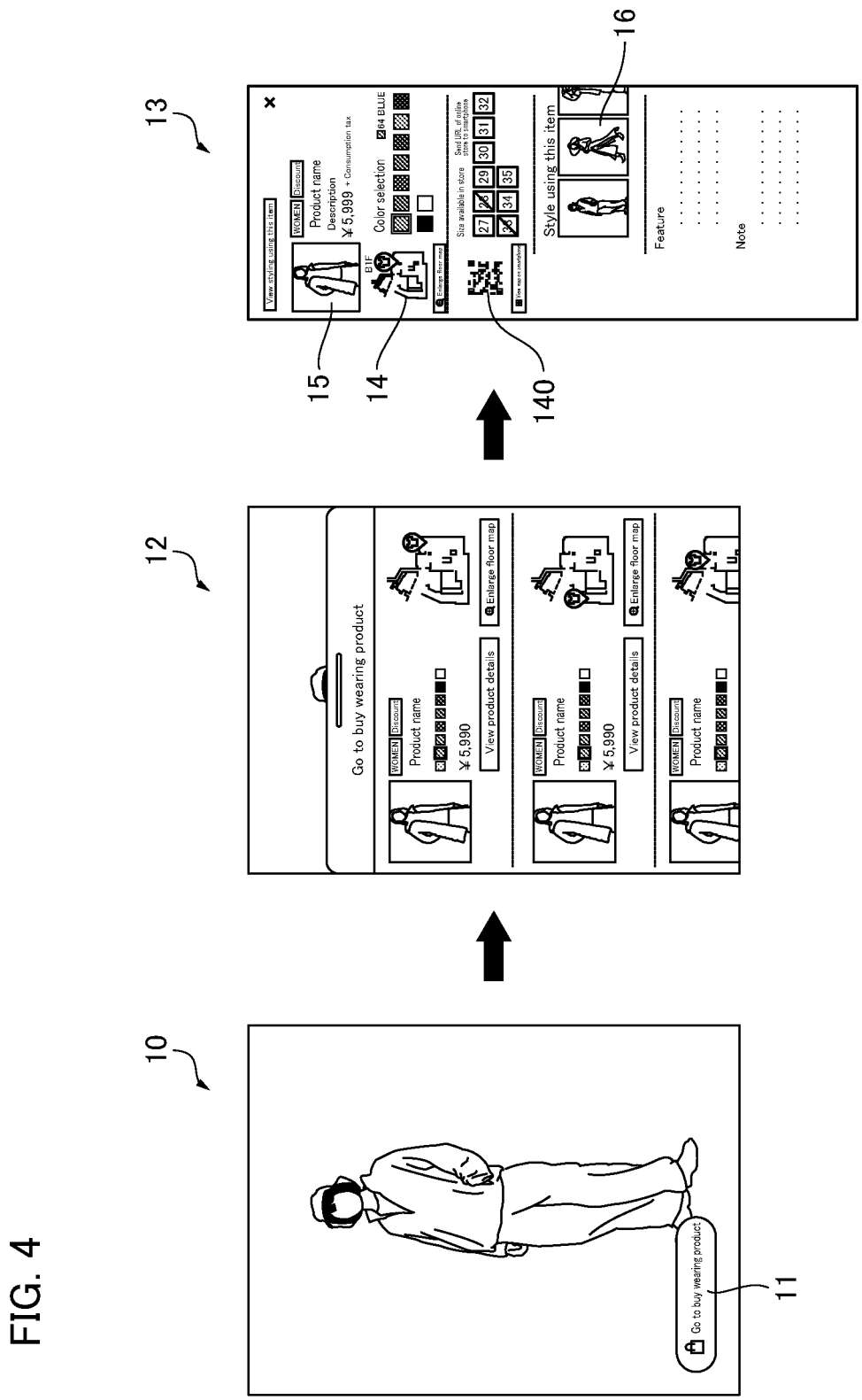
FIG. 4 is a schematic diagram of screen transition of the display device according to the first embodiment.

FIG. 4 is a schematic diagram of screen transition of the display device 100 according to the first embodiment. The screen transition in this diagram corresponds to the sequence diagram in FIG. 3. Here, a case where the product is selected from the coordination image and designated when the product is designated will be described as an example. First, the user taps, for example, an icon 11 of "go to buy wearing products" included in a coordination image 10, and thus the details of at least one or more products included in the coordination image are displayed.

A screen 12 shows an example of a screen on which details of a plurality of products included in the coordination image are displayed. The user selects the product from among the plurality of products represented on the screen 12, and thus, the product is designated. That is, the screen 12 corresponds to the screen displayed on the display device 100 in S1 of FIG. 3.

When the product is designated, a screen 13 is displayed on the display device 100. The screen 13 includes a floor map 14 on which the position of the designated product is represented, a thumbnail image 15 of the designated product, and the code 140 to be read by the mobile terminal 200. The screen 13 corresponds to the screen displayed on the display device 100 in S3 of FIG. 3. At this time, another coordination image 16 including the designated product may be displayed on the same screen. By doing so, it becomes possible to intuitively know a product that is easy to match with the product designated by the user, and it becomes easy to designate the next product.

Figure 5:
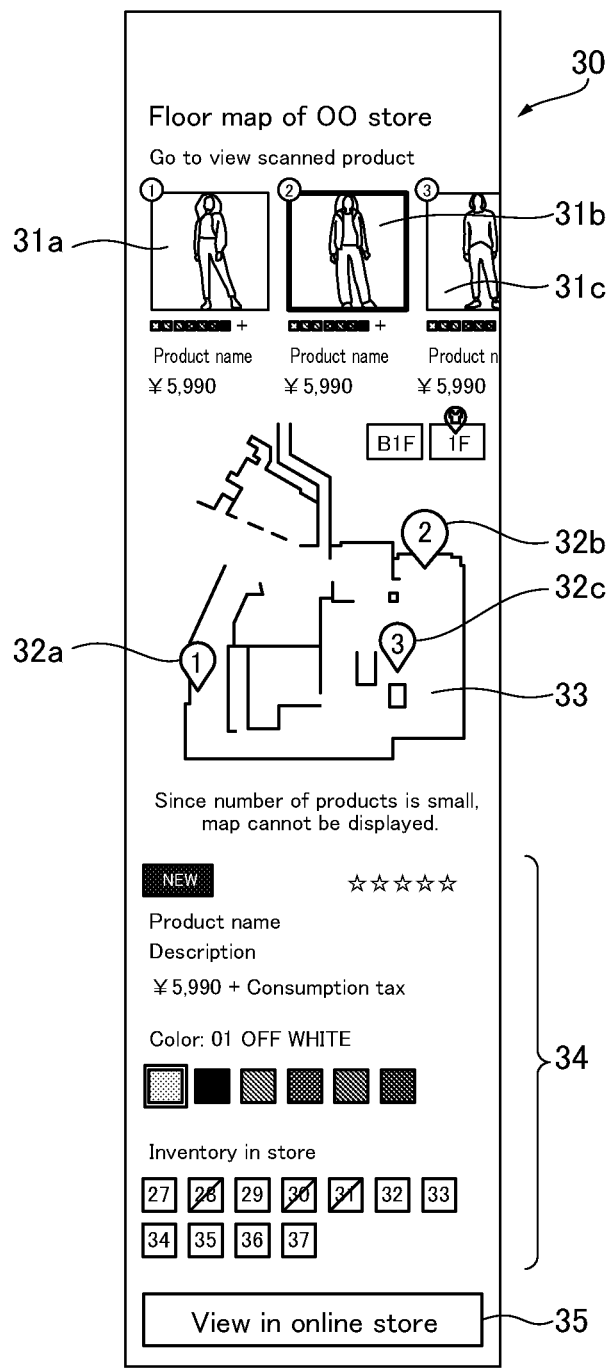
FIG. 5 is a schematic diagram showing an example of a display screen of a mobile terminal according to the first embodiment.

FIG. 5 is a schematic diagram showing an example of a display screen of the mobile terminal 200 according to the first embodiment. A screen 30 is displayed on the mobile terminal 200 by repeating S1 to S4 of FIG. 3 multiple times and reading a plurality of types of codes 140 by the mobile terminal 200. The screen 30 includes a floor map 33 on which thumbnail images 31a, 31b, and 31c corresponding to the plurality of designated products and icons 32a, 32a, and 32c indicating the pieces of positional information of the plurality of designated products are displayed in an identifiable manner. In the example shown in this diagram, the thumbnail image 31a is assigned a number of "1", the thumbnail image 31b is assigned a number of "2", and the thumbnail image 31c is assigned a number of "3". The icons 32a, 32a, and 32c are similarly assigned numbers, and the thumbnail image and the icon assigned the same number correspond to each other. That is, the product indicated by the thumbnail image 31a is displayed at the position indicated by the icon 32a, the product indicated by the thumbnail image 31b is displayed at the position indicated by the icon 32b, and the product indicated by the thumbnail image 31c is displayed at the position indicated by the icon 32c. It is sufficient that the correspondence between the thumbnail image and the icon is recognized, and for example, the same color, figure, or symbol may be used. This diagram shows an example in which the thumbnail image 31b is selected. The selected thumbnail image 31b is emphasized and displayed such that it is easy to recognize the selected state. Here, as an example, the thumbnail image is surrounded and displayed by a frame line, but it is preferable that the thumbnail image is emphasized and displayed by, for example, enlargement, emphasis color, blinking, or the like. It is also preferable that the icon 32b corresponding to the thumbnail image 31c is also emphasized and displayed. Details 34 of the selected product are displayed below the floor map 33. The details 34 of the product include, for example, variations of color information and size information, and inventory information. The icon 35 is selected by the user, and thus, the details and the inventory information of the designated product can be confirmed in an online store.

Such a screen is displayed on the mobile terminal carried by the user, and thus, the user can efficiently search for the plurality of products in the store such as the clothing store.

In the present embodiment, the product DB 150 and the floor map DB 310 have different databases, but the same database may be used.

Second Embodiment

In the above-described embodiment, the example in which the screen including the floor map on which the positions of the plurality of designated products are represented and the thumbnail images of the plurality of designated products is displayed on the mobile terminal 200 by reading the code 140 displayed on the display device 100 by the mobile terminal 200 multiple times has been described. In the present embodiment, an example in which the above-mentioned screen is displayed on the mobile terminal 200 by reading the code displayed on the display device 100 once by the mobile terminal 200 will be described. The same reference signs are given to components and pieces of processing having the same functions as the functions in the above-described embodiment, and the description thereof will be omitted for the components having the same configurations and functions.

Figure 6:
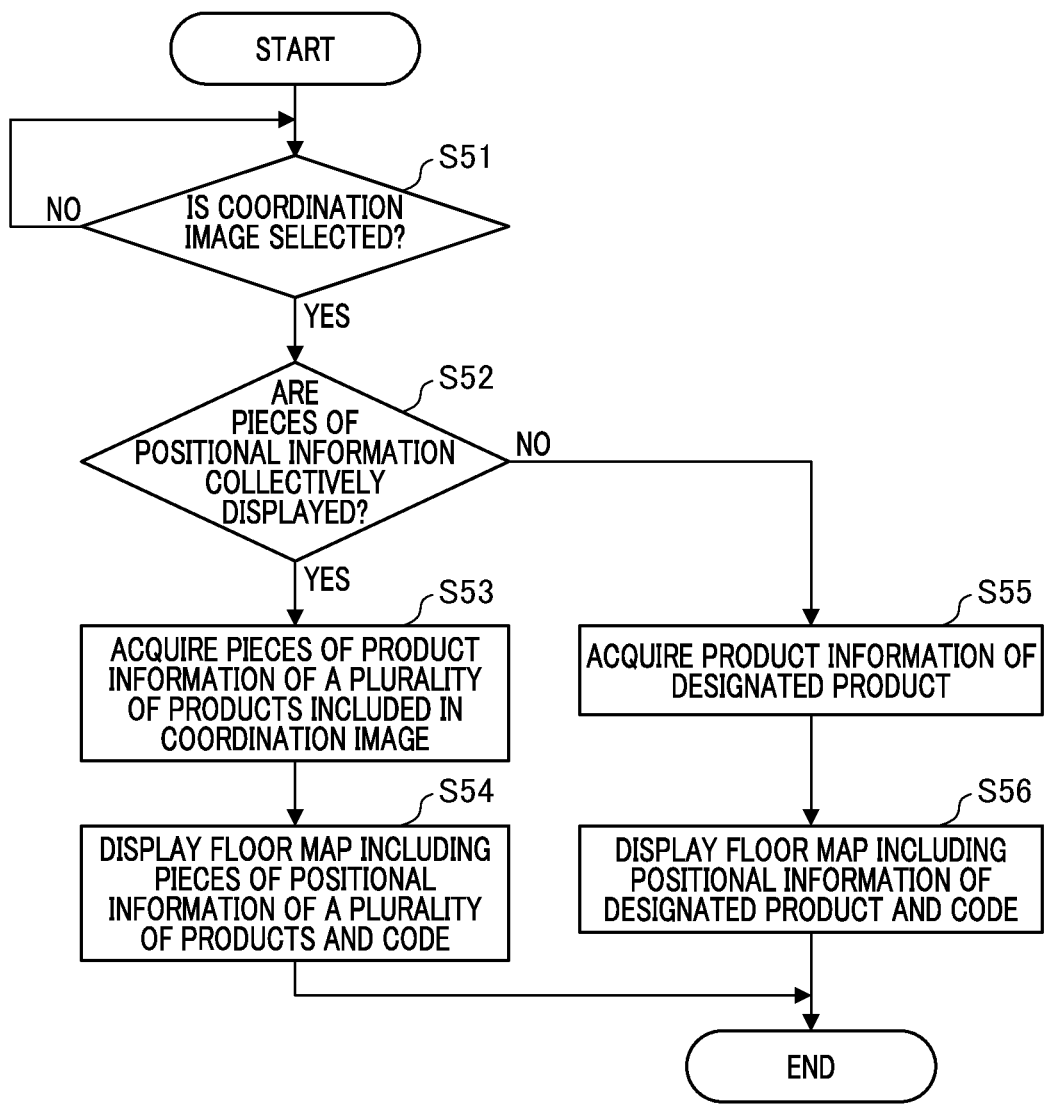
FIG. 6 is a flowchart of floor map display processing of a display device according to a second embodiment.

FIG. 6 is a flowchart of floor map display processing of a display device 100 according to the second embodiment. Each operation (step) shown in this flowchart may be executed by controlling each unit by the CPU 21 included in the display device 100. In this flow, although a case where the plurality of products is designated from the coordination image will be described as an example, the present invention is not limited thereto.

First, the reception unit 131 determines whether or not the coordination image has been selected by the user (S51). When the coordination image is not selected in S51 (No), S51 is executed again. On the other hand, when the coordination image is selected in S51 (Yes), the reception unit 131 determines whether or not selection of collectively displaying the pieces of positional information of the plurality of products included in the coordination image is performed (S52). Here, when the pieces of positional information of the plurality of products included in the coordination image are collectively displayed, the pieces of positional information of all the products included in the coordination image may be collectively displayed, or only a part of the pieces of positional information may be selectable by the user.

When the selection of collectively displaying the pieces of positional information of the plurality of products is performed in S52 (Yes), the communication unit 132 acquires the pieces of positional information of the plurality of products included in the coordination image and the thumbnail images from the product DB 150 (S53). The display control unit 133 performs display such that the icons are identifiable at the positions on the floor map corresponding to the received pieces of positional information and the correspondence between the icons and the thumbnail images is identifiable on the display unit 110. The display control unit 133 displays, on the display unit 110 of the display device 100, the code 140 for displaying the screen including the thumbnail images of the plurality of designated products and the floor map on the mobile terminal 200 by reading the code by the mobile terminal 200 (S53). The code displayed in S53 is read by using the mobile terminal 200, and thus, the mobile terminal 200 can display the screen as shown in FIG. 5.

On the other hand, when the selection of collectively displaying the pieces of positional information of the plurality of products is not performed in S52 (No), the pieces of positional information and the thumbnail images of the designated products are acquired from the product DB 150 (S55). The display control unit 133 displays, on the display unit 110, the floor map on which the positions of the designated products are represented, the thumbnail images of the designated products, and the code to be read by the mobile terminal 200 based on the acquired positional information (S56). Since S55 corresponds to S2 in FIGS. 3 and S56 corresponds to S3 in FIG. 3, detailed description thereof will be omitted.

Figure 7A:
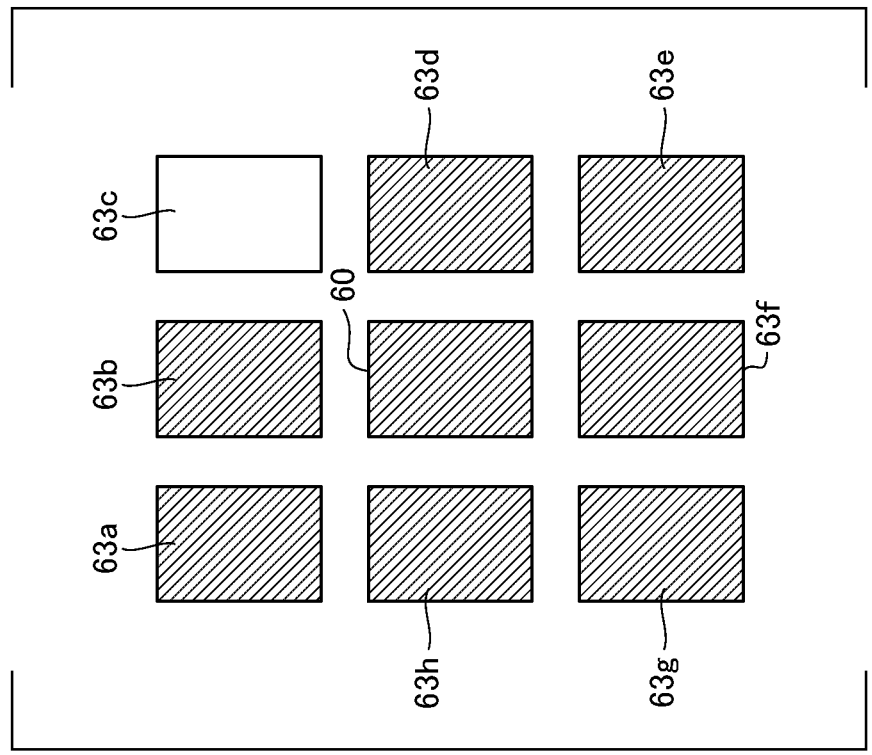
FIG. 7A is a schematic diagram showing an example of an instruction input screen when a coordination image is selected.
Figure 7B:
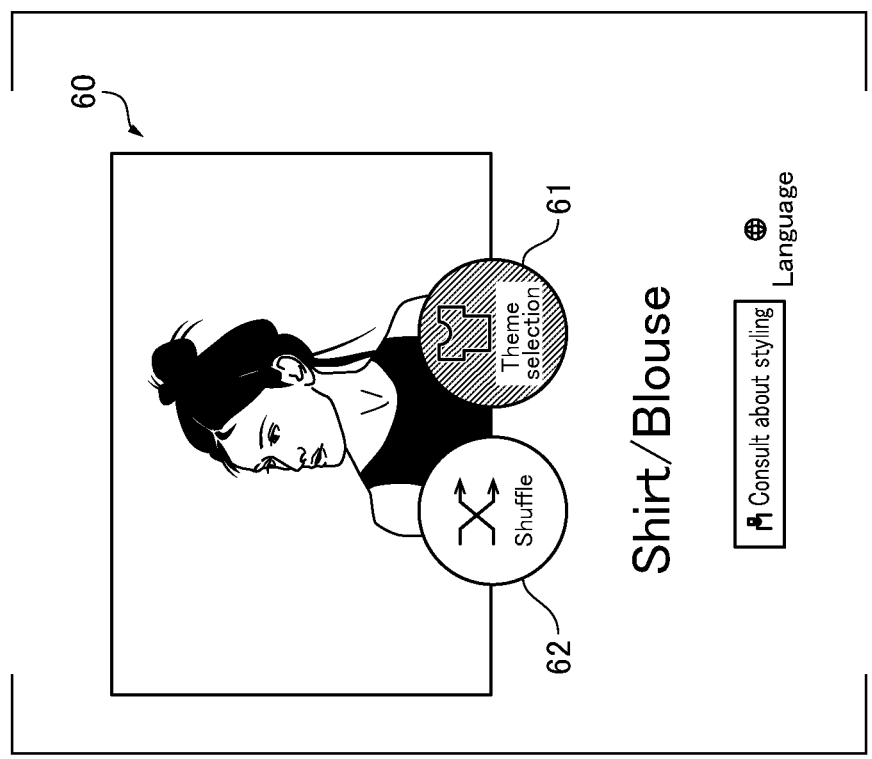
FIG. 7B is a schematic diagram showing an example of a display screen including a plurality of coordination images.

Here, the details of the coordination image selection will be described. FIGS. 7A and 7B are schematic diagrams showing an example of a coordination image selection screen. FIG. 7A is a schematic diagram showing an example of an instruction input screen 60 when the coordination image is selected. For example, the user taps, for example, a theme selection icon 61, and thus, a plurality of coordination themes is displayed. The user selects a favorite theme from among the plurality of displayed themes, and thus, a plurality of coordination images matching the preference of the user is displayed. When there is not the coordination image matching the preference of the user among the plurality of displayed coordination images, the user can change the displayed coordination image to another coordination image by tapping a shuffle icon 62.

FIG. 7B is a schematic diagram showing an example of a display screen including the plurality of coordination images. For example, the instruction input screen 60 is disposed at a position corresponding to a center of the screen, and a plurality of coordination images 63a to 63h is arranged and displayed so as to surround the instruction input screen 60. FIG. 7B shows a case where the coordination image 63c is selected as an example. It is preferable that the selected coordination image is emphasized and displayed. By doing so, it is easy to visually recognize which coordination image is selected from among the plurality of coordination images.

The instruction input screen 60 and the coordination images 63a to 63h may be displayed on different display devices. Specifically, for example, nine tablet terminals used as the display device 100 are arranged as shown in FIG. 7B. The plurality of tablets is operated in cooperation with each other. The number of cooperated tablet terminals is not limited to nine. With such a configuration, even when the number of displayed coordination images is increased, since it is not necessary to reduce the number of coordination images by increasing the number of cooperated tablet terminals, the user is easy to visually recognize the coordination images.

As described above, according to the second embodiment, the code displayed on the display device 100 is read only once by the mobile terminal 200, and thus, the screen that includes the thumbnail images of the plurality of designated products and the floor map including the pieces of positional information of the plurality of designated products can be displayed on the mobile terminal 200.

Third Embodiment

In the above-described embodiment, the example in which the plurality of products is designated by using the display device 100 has been described. In the present embodiment, an example in which the plurality of products is designated by using the mobile terminal 200 will be described. The same reference signs are given to components and pieces of processing having the same functions as the functions in the above-described embodiment, and the description thereof will be omitted for the components having the same configurations and functions. In the present embodiment, it is assumed that the floor map DB 310 stores floor maps of a plurality of stores and pieces of positional information of products in the plurality of stores.

Figure 8:
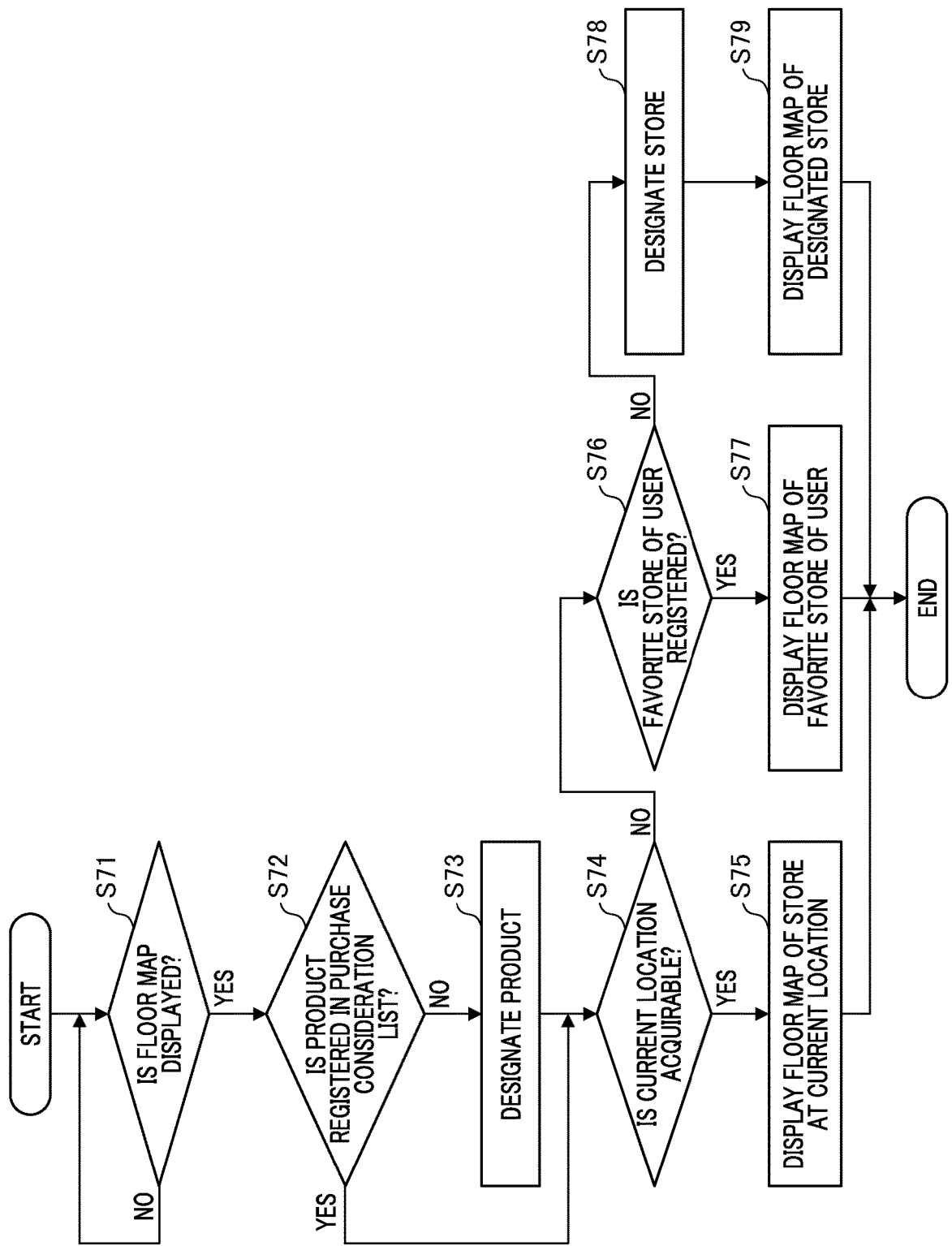
FIG. 8 is a flowchart of floor map display processing of a mobile terminal according to a third embodiment.

FIG. 8 is a flowchart of floor map display processing of the mobile terminal 200 according to a third embodiment. Each operation (step) shown in this flowchart may be executed by controlling each unit by the CPU included in the mobile terminal 200.

First, the reception unit 241 determines whether or not an instruction to display the floor map has been input (S71). When the instruction to display the floor map is not input in S71 (No), S71 is executed again. On the other hand, when the instruction to display the floor map is input in S71 (Yes), the registration unit 242 determines whether or not the product is registered in the purchase consideration list (S72). Here, when the plurality of products is not registered in the purchase consideration list (No), the user designates the plurality of products (S73). The method for designating the product may be the same as the method in the above-described embodiment, and thus, the description thereof will be omitted. On the other hand, when the product is registered in the purchase consideration list (Yes in S72), S74 is executed. When the plurality of products is already registered in the purchase consideration list, the product may be designated (S73). With such a configuration, it is possible to confirm the positional information in the store even for the products that are not registered in the purchase consideration list.

Subsequently, the current location acquisition unit 245 determines whether or not the current location of the mobile terminal 200 can be acquired (S74). When the current location can be acquired (Yes), the display control unit 244 receives a screen that includes thumbnail images of the plurality of designated products and a floor map including pieces of positional information of the plurality of designated products from the server 300 via the communication unit 243. The display control unit 244 then displays the screen on the display unit 210 (S75). The floor map displayed here is a floor map of the store at the current location or a floor map of the store closest to the current location.

On the other hand, when the current location cannot be acquired in S74 (No), the registration unit 242 determines whether or not the favorite store of the user is registered (S76). When the favorite store of the user is registered (Yes), the display control unit 244 receives a screen that includes the thumbnail images of the plurality of designated products and a floor map including the pieces of positional information of the plurality of designated products from the server 300 via the communication unit 243. The display control unit 244 then displays the screen on the display unit 210 (S77). The floor map displayed here is a floor map of the favorite store of the user. When a plurality of favorite stores of the user is registered, the floor map of the designated store is displayed by designating the store of which the floor map is to be displayed. An activity range of the user is specified from the information acquired by the current location acquisition unit 245, and thus, the favorite store of the user may be automatically registered based on the specified activity range.

When the favorite store of the user is not registered in S76 (No), the user designates the store (S78). Candidate stores can be displayed by selecting or inputting, for example, a store name, a place name, a nearest station name, or a zip code, and thus, the store can be designated. Thereafter, the display control unit 244 receives the screen that includes the thumbnail images of the plurality of designated products and the floor map including the pieces of positional information of the plurality of designated products from the server 300 via the communication unit 243. The display control unit 244 then displays the screen on the display unit 210 (S77). The floor map displayed here is a floor map of the store designated in S78.

According to the present embodiment, it is possible to grasp the positions of the plurality of products in the store before the user goes to the store, and it is possible to shorten an operation time in the store.

Figure 9:
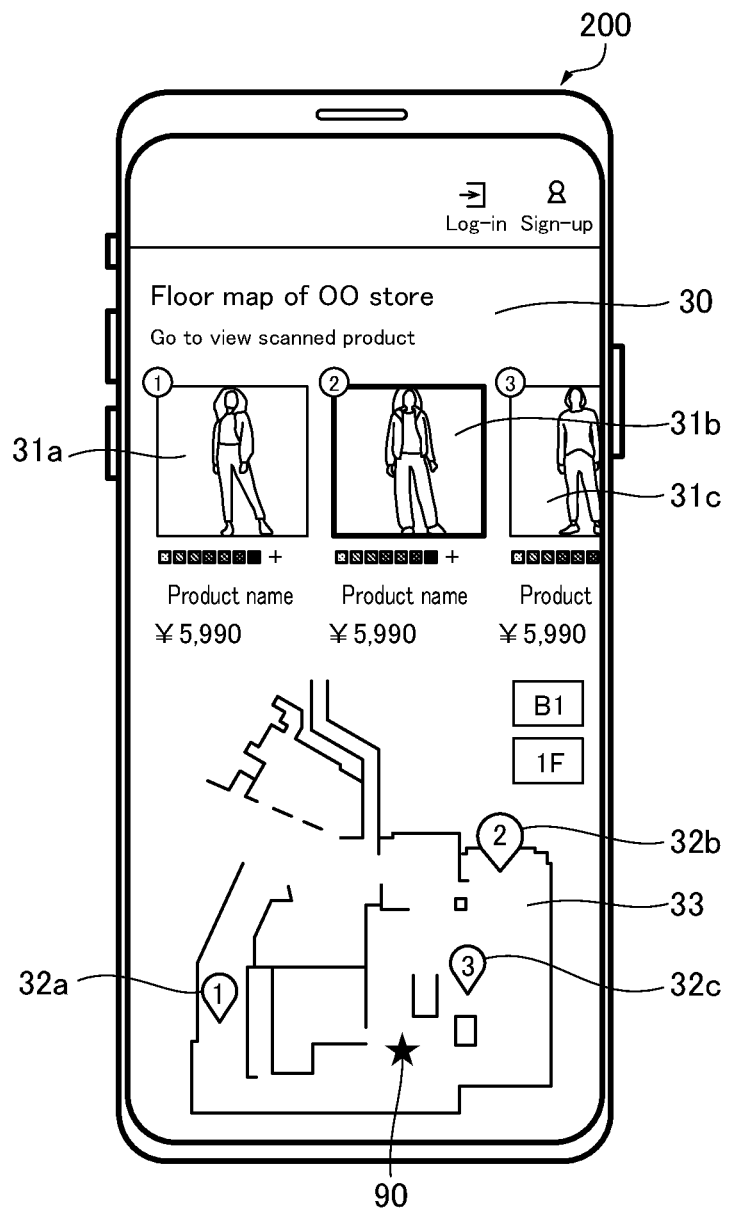
FIG. 9 is a schematic diagram showing an example of a floor map including a current location of a user according to the third embodiment.

When the current location is in the store and the detailed current location in the store can be obtained in S74, it is preferable that the display control unit 244 also displays the current location on the floor map. FIG. 9 is a schematic diagram showing an example of the floor map including the current location of the user according to the third embodiment. A current location 90 is displayed on a floor map 33 with a figure, color, or a symbol different from the icons 32$a$ to 32$c$ indicating the positions of the products in an identifiable manner. With such a configuration, the user can grasp the current location in the store, and can be easy to intuitively grasp by what route it is efficient to look around the plurality of products.

The display of the current location can also be applied to the above-described embodiment. For example, when the display device 100 is a fixed type and the processing unit 130 has information on a position at which the display device 100 is installed, the installation position of the display device 100 may be displayed as the current location on the floor map.

When the product is registered in the purchase consideration list, it is preferable that the thumbnail images and the pieces of positional information of, for example, recommended products, sale products, or products in a campaign are displayed similarly to the designated product based on the plurality of products registered in the purchase consideration list. Here, the recommended product is, for example, a product that has been purchased a relatively large number of times together with the product registered in the purchase consideration list or a product that matches in the coordination image. When the plurality of products is designated even though the products are not registered in the purchase consideration list, the thumbnail images and the pieces of positional information of the recommended products, the sale products, the products in the campaign, or the like may be displayed similarly to the designated products based on the plurality of designated products.

Coupons that can be used at the store corresponding to the displayed floor map or for the designated product may be displayed together. By doing so, a purchasing desire of the user is further increased.

The embodiment can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., non-transitory computer-readable storage medium).

While the embodiment of the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present application claims priority to Japanese Application No. 2020-078957, filed Apr. 28, 2020. The aforementioned application is hereby incorporated by reference herein.

What is claimed is:

1. An information processing device comprising:
   at least one processor; and
   at least one memory comprising instructions configured to, when executed by the at least one processor:
   receive information of at least one of a plurality of clothing items which are registered in a favorite list by a user; and
   display at least one thumbnail image corresponding to at least one of the plurality of clothing items and a floor map on which icons are indicated,
   wherein the icons and the at least one thumbnail image are displayed in such a way that the correspondence between them can be identified on a screen which includes the floor map, and
   wherein at least one of the icons is indicated together with floor number indications to indicate a floor number which the at least one of the plurality of clothing items is located and other icons indicate where the at least one of the plurality of clothing items is located in the floor.

2. The information processing device according to claim 1,
   wherein the information processing device is a mobile terminal, and is configured to register information regarding a favorite store that the user often visits by the user designating the store, and
   the instructions are configured to display the at least one thumbnail image and a floor map for the favorite store.

3. The information processing device according to claim 2,
   wherein the mobile terminal comprises a current location acquisition unit configured to acquire a current location of the mobile terminal, and
   wherein the favorite store is automatically registered based on a specified activity range of the user acquired by the current location acquisition unit.

4. The information processing device according to claim 1, wherein the instructions are configured to display a thumbnail image and an icon corresponding to at least one of a recommended clothing item, a sale clothing items, and a clothing item in a campaign based on the plurality of clothing items.

5. The information processing device according to claim 1, wherein the instructions are configured to display a current user position on the floor map in an identifiable manner.

6. An information processing method comprising:
   displaying at least one thumbnail image corresponding to at least one of a plurality of clothing items which are registered in a favorite list by a user and a floor map on which icons are indicated,
   wherein a correspondence between the icons and the at least one thumbnail image displayed is displayed on a screen which includes the floor map in an identifiable manner, and
   wherein at least one of the icons is indicated together with floor number indications to indicate a floor number which the at least one of the plurality of clothing items is located and other icons indicate where the at least one of the plurality of clothing items is located in the floor.

7. A non-transitory computer readable storage medium storing a program configured to, when executed by a computer, perform an information processing method, the method comprising:
   displaying at least one thumbnail image corresponding to at least one of a plurality of clothing items which are registered in a favorite list by a user and a floor map on which icons are indicated,
   wherein a correspondence between the icons and the at least one thumbnail image displayed is displayed on a screen which includes the floor map in an identifiable manner, and
   wherein at least one of the icons is indicated together with floor number indications to indicate a floor number which the at least one of the plurality of clothing items is located and other icons indicate where the at least one of the plurality of clothing items is located in the floor.

* * * * *